United States Patent
Newman et al.

[19]

[11] Patent Number: 5,907,816
[45] Date of Patent: May 25, 1999

[54] HIGH GAIN ANTENNA SYSTEMS FOR CELLULAR USE

[75] Inventors: Edward M. Newman, Nesconset; Alfred R. Lopez, Commack; Gary A. Schay, Stony Brook; John F. Pedersen, Northport, all of N.Y.

[73] Assignee: Marconi Aerospace Systems Inc. Advanced Systems Division

[21] Appl. No.: 08/881,263

[22] Filed: Jun. 24, 1997

Related U.S. Application Data

[62] Division of application No. 08/379,820, Jan. 27, 1995, Pat. No. 5,684,491.

[51] Int. Cl.[6] .................................................. H04B 1/16
[52] U.S. Cl. .............................. 455/562; 455/277.2
[58] Field of Search ............................... 455/561, 562, 455/133, 134, 135, 136, 273, 277.1, 277.2, 278.1; 342/372, 374, 354

[56] References Cited

U.S. PATENT DOCUMENTS 5,603,107  2/1997  Gottfried et al. ............... 455/277.2
5,634,206  5/1997  Reed et al. ...................... 455/277.1
5,684,491  11/1997 Newman et al. ................ 455/277.1

*Primary Examiner*—Thanh Cong Le
*Attorney, Agent, or Firm*—Edward A. Onders; Kenneth P. Robinson

[57] ABSTRACT

In a cellular type communication system a sector antenna 12 provides coverage of a sector with a relatively low receive gain. A multi-beam antenna 20 covers the same sector with a plurality of narrower beams 21', 22', 23' and 24' providing higher gain. A multi-beam antenna system 10 provides higher gain operation by selecting the one of the narrower beams 21', 22', 23' or 24' currently providing best reception of a signal transmitted by a user and coupling that selected beam to a system receiver 18. Beam selection is accomplished by sequentially coupling each narrow beam to a microprocessor based control unit 40 and storing samples of user signals as received in each narrow beam on a continuing repetitive basis. The stored samples are then analyzed in order to select the beam currently providing best reception.

15 Claims, 5 Drawing Sheets

HIGH GAIN ANTENNA SYSTEMS FOR CELLULAR USE

This application is a division of application Ser. No. 08/379,820 filed Jan. 27, 1995, U.S. Pat. No. 5,684,491.

This invention relates to antenna systems for communicating with mobile users and, more particularly, to multi-beam antenna systems and methods providing higher gain reception of signals transmitted by mobile user equipment and which may also provide higher gain transmission to mobile users.

BACKGROUND OF THE INVENTION

Radio communication with mobile users in moving vehicles, for example, is typically provided via fixed base stations or cell sites. Each cell site includes one or more antennas arranged for transmission of signals to and reception of relatively low power signals from mobile user equipment presently within a limited geographical area around the cell site. To provide the desired antenna coverage, the area around the cell site may be divided into sectors. Four sectors each of 90 degrees in azimuth coverage, or three 120 degree sectors, thus provide 360 degrees azimuth coverage around a cell site. In some applications the sector may be expanded to provide full 360 degree azimuth coverage. The cell terminology reflects the necessity of providing a pattern of adjacent cells, each with its own cell site antenna installation, in order to provide mobile communications coverage over a geographic area or region larger than the limited area covered by a single such installation.

Considering one of the 120 degree sectors referred to, it is relatively straightforward to design an antenna system providing 120 degree sector coverage. The antenna system will be effective to transmit signals to any user within the desired sector coverage area. If signals are too weak to reliably reach users at the outermost edge of the sector coverage area, transmitter power can be specified at a higher level. However, for signals to be received from a user at the sector edge, user transmissions are normally subject to limitations in power transmitted from the mobile equipment. If the user's transmitted power is inadequate to achieve reliable reception from the outer portions of the sector coverage area, the overall size of the cell and the gain of the receive antenna at the fixed cell site become limiting considerations. A number of interrelated factors, including expected user population and available broadcast frequency spectrum, may also be involved in determining the optimum size of the coverage area of each cell site. It will be apparent, however, that with smaller coverage areas additional cell site installations will be necessary to provide continuous coverage over a geographical region. Additional cell site installations require the purchase, installation and maintenance of more equipment as well as increased requirements and costs of site acquisition, interconnection facilities and system support.

Use of higher gain receive antennas at each cell site would permit reliable reception of user signals at greater distances. However, for a given type of antenna, gain is directly related to beamwidth and an antenna providing coverage over a 120 degree azimuth sector typically provides relatively low gain performance. Higher gain is also possible by use of narrow beamwidth antennas providing coverage of only a portion of a sector. However, sector coverage may then entail multiple beams, or beam scanning or steering, requiring complex control and support systems in order to provide full sector coverage, with resulting higher cost and complexity and possible limitations on overall performance and user capacity.

Objects of the present invention, therefore, are to provide new and improved multi-beam receive antenna systems, and methods for receiving cellular communication signals by use of multi-beam antennas, and such systems and methods which provide one or more cost or operational advantages over prior mobile communication or other types of antenna systems.

SUMMARY OF THE INVENTION

In accordance with the invention, a multi-beam antenna system, suitable for use in a communication system including a sector antenna having a beamwidth providing sector coverage, a transmitter and a receiver system for receiving user signals from a user located in the sector, includes the following. A multi-beam first antenna provides a plurality of first antenna beams which are narrower than the sector and collectively cover at least a portion of the sector. A plurality of beam ports are each arranged for coupling first antenna beam signals received in one of such first antenna beams. Multicoupler means, coupled to each of the beam ports, make first antenna beam signals received in each first antenna beam available at a plurality of parallel ports. A plurality of switching means, each coupled to each of the beam ports via the parallel ports and having a switch output port and each responsive to selection signals, are arranged for selectively providing any one of the first antenna beam signals at a first switch output port coupled to the receiver system and any one of the first antenna beam signals also available at a second switch output port.

The antenna system also includes controller means, coupled to the second switch output port of the switching means, (a) for providing selection signals to the switching means to cause first antenna beam signals received in different ones of the first antenna beams to be sequentially provided at such second switch output port, (b) for analyzing the sequentially provided beam signals and selecting, on a predetermined basis, first antenna beam signals received in one of the first array beams, and (c) for providing selection signals to the switching means to cause such selected first antenna beam signals to be coupled to the receiver system, via the first switch output port, to enable reception of user signals. More particularly, such predetermined basis may be the highest amplitude, or the best available signal to spurious signal ratio, for signals received from an identified user of the communication system. Also, the controller means may be configured to continue analysis of sequentially provided first antenna beam signals and selection of first antenna beam signals received in one of the first antenna beams on such predetermined basis. The controller means will thus be responsive to changes in signal reception by causing selected first antenna beam signals received in a different one of the first antenna beams to be coupled to the receiver system when first antenna beam signals in the different beam are found to exhibit relatively higher amplitude characteristics, for example.

The antenna system may also include a beam port arranged for coupling sector beam signals received by the sector antenna, so that sector beam signals can be selectively provided at the first and second switch output ports in the same manner as the first antenna beam signals. With this configuration the controller means is arranged for providing selection signals to the switching means to cause the sector beam signals to be coupled to the receiver system in the absence of any first antenna beam signals being selected and coupled to the receiver system. This alternative use of the sector beam signals provides a minimum level or fail-safe mode of operation.

Also in accordance with the invention, a method for receiving cellular communication signals from a user located in an azimuth sector by use of an antenna beam narrower than such sector, comprises the steps of:

(a) identifying a user signal by use of sector beam signals received in a sector beam providing antenna beam coverage of the sector;

(b) providing a first plurality of narrow beams, each providing antenna beam coverage narrower than the sector and collectively providing coverage of at least a portion of the sector;

(c) analyzing narrow beam signals received in each of the narrow beams with respect to the presence of such user signal;

(d) selecting, on a predetermined basis, one of the narrow beam signals; and (e) coupling the selected narrow beam signal to an output port to enable coupling of the user signal to a receiver.

The method may additionally include repetition of steps (c), (d) and (e) to monitor changing reception conditions resulting in selection of a different one of the narrow beam signals and coupling of such different narrow beam signal to the output port.

A beam selection method which, in accordance with the invention, is usable in a communication system wherein a user signal may initially be received in different ones of a plurality of available time slots, includes the following steps:

(a) providing a plurality of contiguous antenna beams;

(b) receiving an initial signal from a user in a first time slot of a repetitive series of time slots;

(c) determining which antenna beam provided the strongest reception of the initial signal;

(d) assigning the antenna beam determined in step (c) for reception of subsequent signals from the user in all available time slots within a time period;

(e) providing a relative count for each antenna beam of occurrences of strongest reception of signals from the user in available time slots within the time period; and (f) selecting for reception of signals from the user the antenna beam for which the step (e) relative count is the highest.

For a better understanding of the invention, together with other and further objects, reference is made to the accompanying drawings and the scope of the invention will be pointed out in the accompanying claims.

DESCRIPTION OF THE INVENTION

Figure 1:
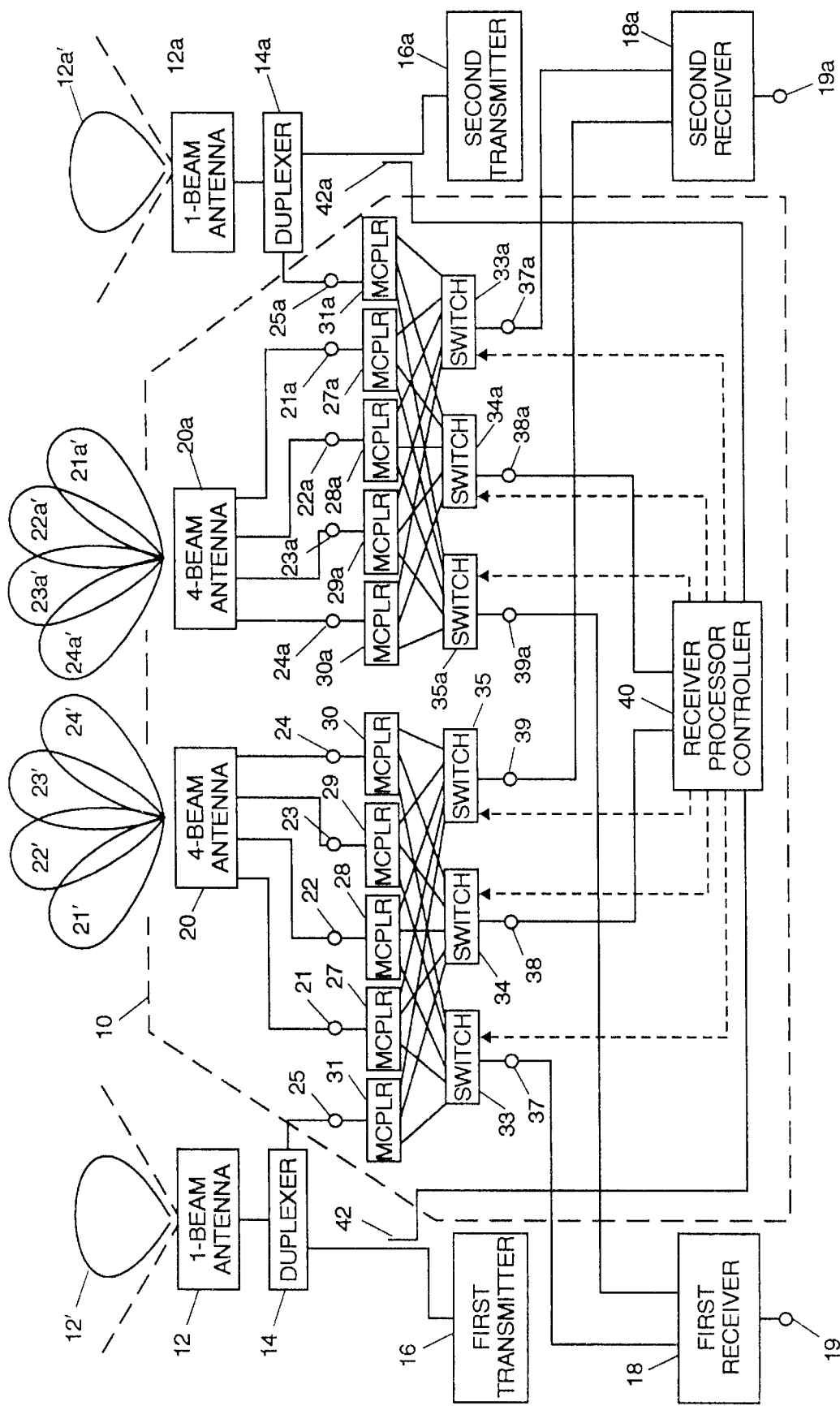
FIG. 1 illustrates a cellular type communication system incorporating a multi-beam receive antenna system in accordance with the invention.

Referring now to FIG. 1, there is illustrated a form of communication system for receiving signals from a mobile user and a form of multi-beam receive antenna system 10 suitable for use in such communication system to provide higher gain reception of user signals. An arrangement also enabling higher gain transmission will be described below.

The communication system includes a sector antenna 12, a duplexer 14, a transmitter 16 and a receiver system 18. The communication system also includes a similar sector antenna 12a which is desirably laterally spaced from sector antenna 12 by several wavelengths at a frequency in the operating band in order to provide spaced diversity signal reception via two different signal paths to a user location. In this example, each of sector antennas 12 and 12a have a beamwidth effective to provide coverage of a 120 degree azimuth sector, so that fully overlapping coverage of the sector results. This system also includes a duplexer 14a, a second transmitter 16a and a second receiver system 18a. Transmitter 16a and receiver system 18a may be arranged to operate at frequencies different from the signal frequencies utilized by transmitter 16 and receiver system 18, in order to provide additional operational capacity. Following reception, user signals are provided at receiver outputs 19 and 19a for further processing or transmission to parties intended by the users. In the absence of antenna system 10 each of antennas 12 and 12a would be connected to receiver system 18 to enable receiver system 18 to utilize first user signals received via sector antenna 12 or sector antenna 12a, or such signals from both antennas in combination. Similarly, in the absence of antenna system 10, receiver system 18a would be arranged to utilize signals from either or both of antennas 12 and 12a for reception of signals from a second user transmitted at a different frequency. In other applications, the basic communication system may include only a single transmitter/receiver/antenna combination or may have a variety of other configurations.

The multi-beam receive antenna system 10, as shown in FIG. 1, includes multi-beam first antenna means, shown as antenna 20, which may comprise four side-by-side vertical arrays of dipoles or other radiating element arrangements suitable for providing four first antenna beams 21'–24' each having a beam width narrower than the 120 degree sector and aligned so that the four beams collectively cover at least a portion of the sector. Typically, if a four beam antenna configuration is used the first antenna beams will be arranged to collectively cover the full 120 degree azimuth sector. In other embodiments more than one array may be provided to form each beam, or more or less than four beams may be provided, or both. The desired beams may be provided using arrays of radiating elements, with or without the inclusion of a suitable beam forming network, or in other suitable manner by persons skilled in the field. As shown, beam ports 21–24 are provided for each coupling first antenna beam signals received in one of the four first antenna beams provided by antenna 20. Beam port 25 similarly provides coupling of sector beam signals received in the beam of sector antenna 12.

The FIG. 1 receive antenna system 10 also includes multicoupler means 27–30 respectively coupled to each of the beam ports 21–24. As shown, the multicoupler means 27–30 make each of the first antenna beam signals provided at the beam ports 21–24 available at a plurality of three parallel ports represented by the three output leads shown emanating from the bottom of each of units 27–30 in FIG. 1. In addition, as shown at 31 the multicoupler means similarly makes sector beam signals coupled via duplexer 14, available at three parallel ports. Multicoupler units 27–31 may take the form of receiver amplifiers and associated signal splitting circuitry responsive to received signals for providing low-noise amplification and multiport access to each respective signal, while maintaining or translating the carrier frequency of the received signals, as desired in particular applications. In other embodiments more or fewer than three parallel ports may be employed. Low noise amplifiers may be included at each of the multicoupler units 27–31, at each of the beam outputs of antenna 20 prior to the beam ports 21–24, or at both such locations, as appropriate. Other types of multi-output junction devices or matrix coupling arrangements may be utilized by skilled persons to provide the desired multicoupler capability.

As illustrated, the receive antenna system 10 further includes a plurality of switching means, shown as single-pole five position switching devices 33–35. Each of switching devices 33–35 is thus coupled to each of the beam ports 21–25, via the parallel output ports of multicoupler units 27–31. The switching means have a plurality of switch output ports 37–39 respectively coupled to switching devices 33–35 and each switching device is responsive to selection signals provided via the dashed lines respectively connected to each of the switching devices 33–35. With this arrangement, any one of the first antenna beam signals from antenna system 10 can be selectively provided on an independently selected basis at first switch output port 37, at second switch output port 38 and at third switch output port 39. As shown, the first and third switch output ports are respectively connected to the first and second receiver systems 18 and 18a. The switching devices 33–35 comprising the switching means may be any suitable form of electrical, electronic, mechanical, optical or other form of device appropriate for enabling selective coupling of one of a plurality of inputs to an output.

Controller 40 is also included in the FIG. 1 receive antenna system 10, as shown. Controller 40 is coupled to the second switch output port 38 and also to each of switching devices 33–35 by dashed lines representing the paths of selection signals for individual selection of the one of the first antenna beam signals which is to be provided at switch output ports at any particular point in time. Controller means 40 is configured, as will be further described, for carrying out a plurality of functions, including the following. First, for providing selection signals to the switching device 34 of the switching means to cause first antenna beam signals received in different ones of the beams of first antenna 20 to be sequentially provided at the second switch output port 38 and thereby input to controller 40. Such sequential selection is desirably carried out on a continuous basis while the receive antenna system 10 is in operation. Second, for analyzing the sequentially provided beam signals and selecting, on a predetermined basis, beam signals received in one of the first antenna beams (e.g., beam 21' of antenna 20). Such selection basis may comprise selection of the beam signal having the highest user signal amplitude, or the best signal to spurious signal ratio, relative to the other three first antenna beam signals, for the particular user signal of interest at that time. Third, for providing selection signals to switching device 33 of the switching means to cause the selected beam signals (e.g., signals from beam 21') from the first antenna 20 to be coupled to receiver system 18 via the first switch output port 37. As a result, the user signal is provided to receiver system 18 based upon reception by a narrow beam/high gain antenna which in this case would provide antenna gain on reception about 6 dB higher than provided by sector antenna 12.

In operation, controller 40 can be arranged to continue such signal analysis and selection. As a result, if the user changes position or environmental signal transmission conditions change, so that better coverage of the new position of the user is provided by one of the other beams of antenna 20 (e.g., beam 22') signals from that beam will be coupled to receiver system 18. Controller 40 can also be configured to handle a plurality of incoming signals from different users in the same time period by repetitively processing each such signal during very short time intervals within the time period or by application of other techniques available for use in multiple signal reception in the context of different applications of the invention. Configuration of controller 40 will be discussed further below. As shown in FIG. 1, controller 40 is also enabled to control the coupling of signals received in the sector beam 12' of sector antenna 12 via selection signals supplied to switching device 33. In a typical operating arrangement, user signals from sector antenna 12 are provided to first receiver 18: (a) initially for user verification; (b) when such signals have a better signal to spurious signal ratio than signals from any of beams 21'–24'; (c) when the receive antenna system 10 is inoperative or being serviced; (d) when the signal level is high because the user is very close to the fixed cell site; or (e) under other defined operating conditions. With such a fail/safe fall back configuration, the communication system has a continuing capability of providing a basic level of performance which is equivalent to performance without the presence of antenna system 10.

A number of further aspects of the FIG. 1 configuration should be addressed. With the exception of controller 40, the receive antenna system 10 as shown includes two mirror-image right and left portions. All elements on the right side of FIG. 1 bear corresponding reference characters including an "a" suffix. If the two four beam antennas 20 and 20a are laterally spaced and each provides full coverage of the sector, spaced diversity reception will be available for each user position in the sector. The signal analysis, signal selection and selection signals provided by controller 40 will thus cause to be made available to receiver 18 for a specific user, user signals from one of the beams of antenna 20 coupled via switch output port 37 to the left input to receiver system 18 and user signals from one of the beams of antenna 20a coupled via switch output port 39a to the right input to receiver system 18. Receiver system 18 may then select its right or left input as providing the best quality user signal reception or may appropriately combine signals from both inputs by additive combination or in any appropriate fashion. As previously noted, transmitter 16a and receiver system 18a may be arranged to operate at signal frequencies different from those used by transmitter 16 and receiver 18. This enables controller 40, in operation parallel to that already described, to select the best beam signals received by antennas 20 and 20a from a second user, transmitting at a frequency different from the first user, and cause those second user signals to be coupled to the left and right inputs of receiver 18a, independently of the first user signals coupled to receiver 18. As a separate matter, there are also included in FIG. 1 sampling couplers, shown as directional couplers 42 and 42a, arranged to provide to controller 40 very low power samples of signals transmitted by transmitters 16 and 16a respectively. Such samples (which may be at levels 30 dB below transmitted power, for example)

enable controller 40 to derive synchronizing signals for reference purposes relative to the time of reception of user signals.

Figure 2:
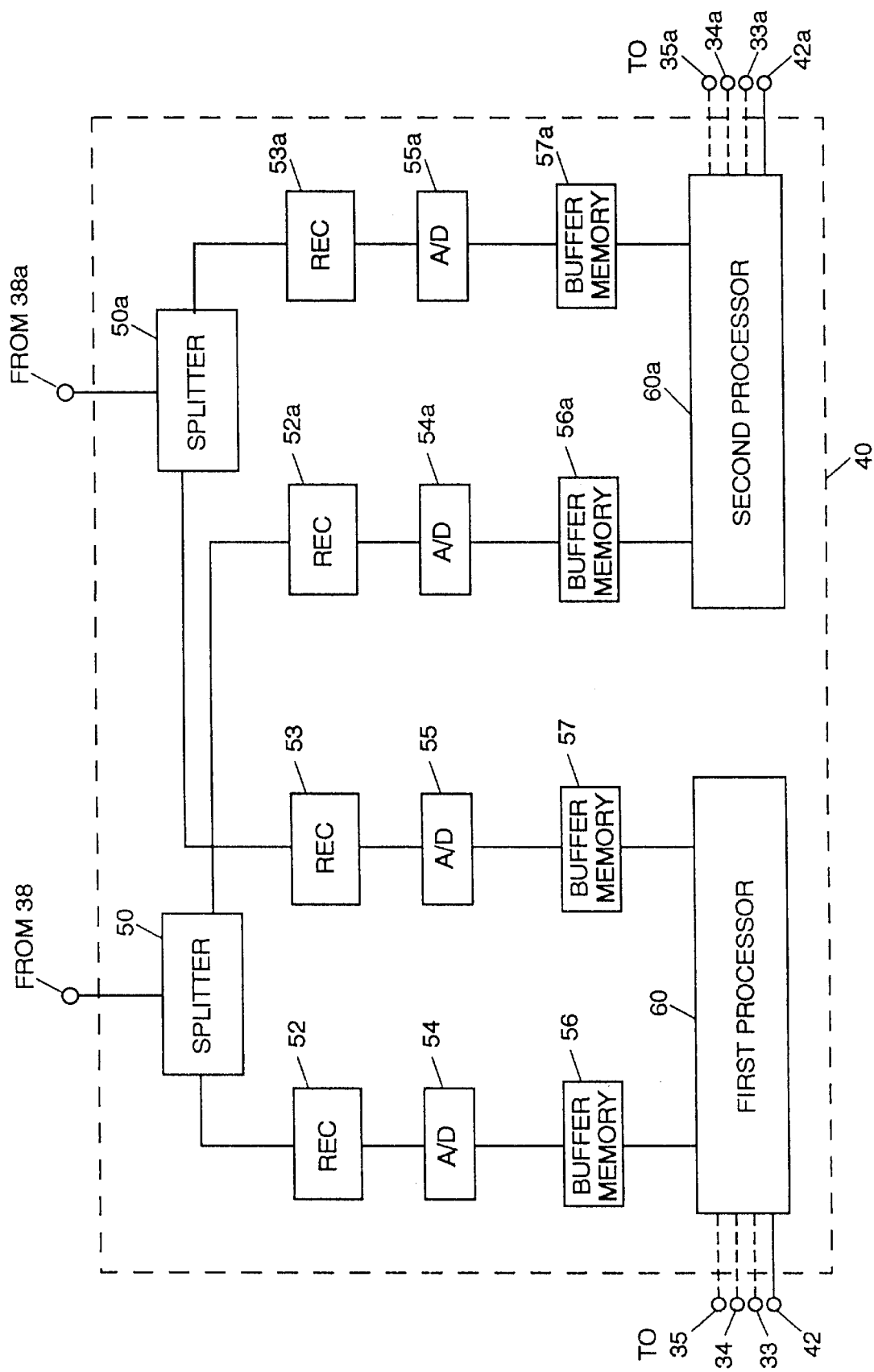
FIG. 2 shows in greater detail a form of controller unit suitable for use in the FIG. 1 system.

With reference now to FIG. 2, there is illustrated one form of controller 40 suitable for use in the receive antenna system 10 of FIG. 1. As shown, signal splitters 50 and 50a receive radio frequency beam signals from respective switch output ports 38 and 38a included in FIG. 1. Splitter 50 provides portions of the beam signal from port 38 to the inputs of receivers 52 and 52a. Receiver 52 selects and demodulates to video frequency format the first user/first frequency signal from the selected beam signal of antenna 20 (or antenna 12, depending on which signal is provided at port 38 at a particular point in time). The resulting video signal is processed by analog to digital converter 54 and stored in digital form in buffer memory 56. Similarly, splitter 50a provides portions of the beam signal from port 38a to the inputs of receivers 53 and 53a. Receiver 53 selects and demodulates the first user/first frequency signal from antenna 20a, which is then converted to digital form and stored in buffer memory 57. In the same manner, second user/second frequency signals from antennas 20 and 20a are respectively selected by receivers 52a and 53a, processed and stored in buffer memories 56a and 57a.

First and second processors 60 and 60a provide microprocessor based central processing functions for processing the stored digital signals for signal analysis and selection. In one mode of operation, within each time slot of about 15 milliseconds duration, 120 samples of incoming signals are stored in buffer memory 56 for processing in the following time slot. As a result of the continuous sequential switching of switching device 34, under the control of selection signals from controller 40, these 120 samples will successively include samples of signals received in each of beams 12' and 21'-24'. Of these 120 samples, 24 samples of the signals from sector antenna 12 are used to identify and validate an incoming transmission from a first user. As represented in the FIG. 3 angle/time diagram, successive groups of 24 samples of signals from first antenna beams 21', 22', 23' and 24' are then used for analysis and selection of the beam signal providing the highest quality signal from the first user (e.g., best signal to spurious signal ratio). The selected beam signal (e.g., beam 21') is then caused to be coupled to receiver system 18 via port 37 as a result of selection signals provided to switching device 33 from controller 40. Depending upon the system timing configuration, the process of storing 120 samples in a first time slot, with analysis of those samples of the first user signals received by antenna 20 in the following time slot, will be repeated about six times every 90 milliseconds. Between such repetition of storage and analysis of the first user signals, in this mode of operation signals received from five other users can be stored and analyzed in five intermediate time slots each of 15 millisecond duration. The cycle of sampling at a rate of one sample per each 125 microseconds to provide 120 samples for a first user signal in a first time slot, and doing the same for five additional users in the next five time slots, represents a processing frame which is repeated cyclically. Concurrently, the stored samples stored in one time slot are analyzed in the following time slot. Thus, the first user samples are stored in the first time slot and analyzed in the second time slot, the second user samples are stored in the second time slot and analyzed in the third time slot, etc. Then, in the next frame of operation new samples for the first user are stored in the seventh time slot, etc., the seventh time slot thus representing the start of the second frame of six time slots. If the analysis of second frame new samples for the first user indicate that the first user signals have become stronger in a different beam, action is taken to cause that different beam to be coupled to the receiver system. As part of the processing and analysis procedure, signal samples stored in the first time slot of successive frames for the first user can be subjected to averaging to smooth the effects of multipath reception. The preceding operations are carried out in first processor 60 in cooperation with receiver 52, converter 54 and buffer memory 56. A variety of different signal sampling and processing approaches can be employed. For example, a smaller number of signal samples can be selected in time slots of shorter duration. Also, processing of samples can be initiated in parallel as later samples are received in the same time slot, rather than providing for processing in the next time slot as discussed above.

Figure 3:
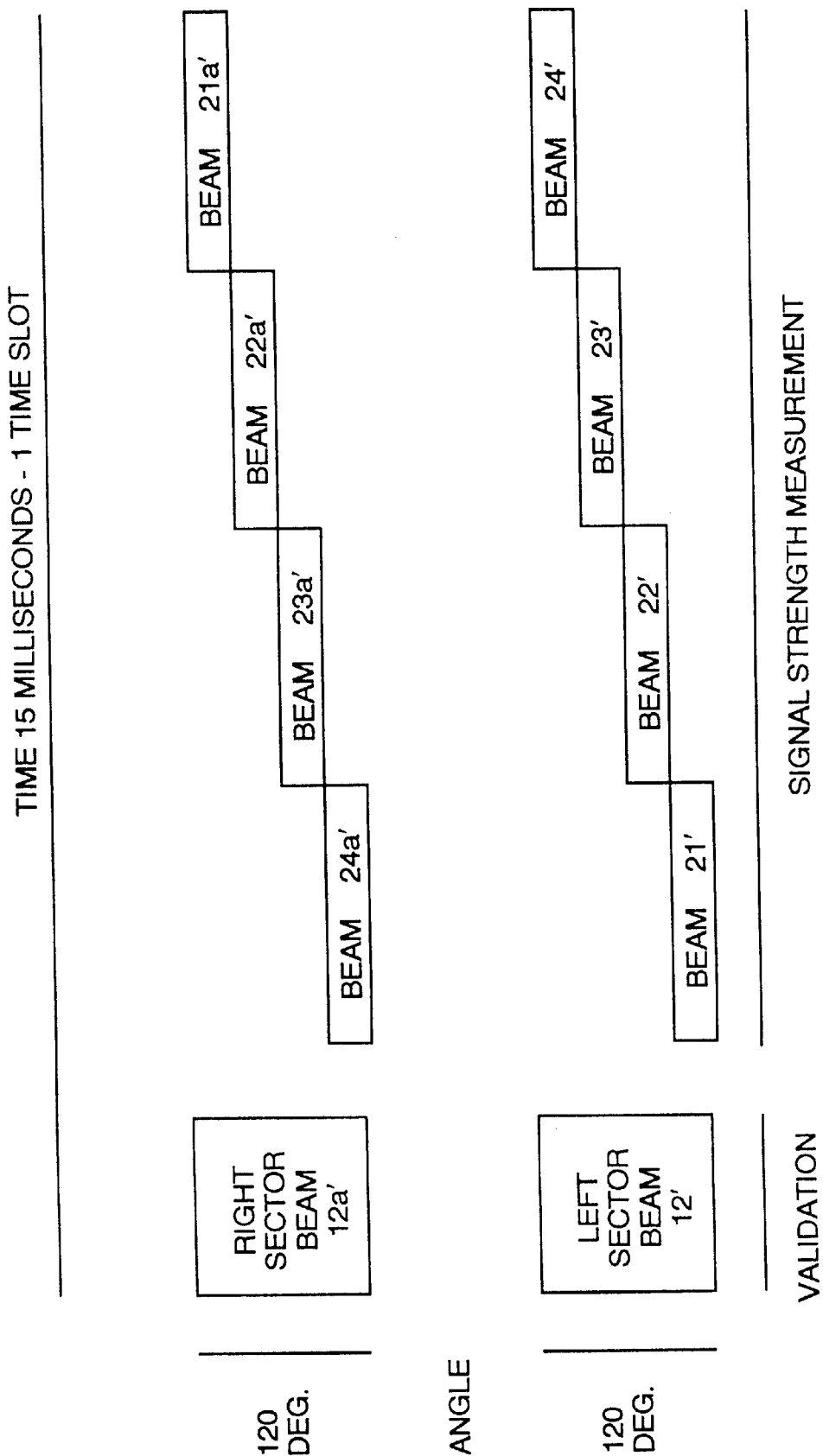
FIG. 3 provides an angle/time diagram useful in describing operation of the invention.

With reference to the upper portion of FIG. 3 it will be appreciated that the same processing is concurrently carried out in first processor 60 in cooperation with units 53, 55 and 57 with respect to first user signals received in sector beam 12a' and beams 24a', 23a', 22a' and 21a'. In the same manner, the preceding type operations are carried out concurrently, for user signals transmitted at the second frequency, in the corresponding units on the right side of FIG. 2 which are identified by the "a" suffix reference characters. As a result, the second processor 60a is effective to cause selected second user/second frequency signals received by antennas 20 and 20a coupled to the second receiver system 18a to be processed and provided at terminal 19a for further use or processing. Once having an understanding of the present invention and a desired mode of operation, each element of the FIG. 2 controller can be implemented in one or more alternative forms by persons skilled in the field. As described, the receive antenna system 10 is applicable in various embodiments to many types of communication systems which include sector antennas. Examples are cellular telephone systems and specialized mobile radio (SMR) dispatch and interconnect services used by truck and taxi companies. In other applications, antenna systems in accordance with the invention, utilizing one or more multi-beam antennas, may be used in transmit and receive modes without the presence of wide beam sector antennas. Also, various digital and other transmission techniques, including pulse-code modulation, and multiple access techniques, such as frequency division, time division or code division multiple access, can be employed in systems utilizing the invention. Persons skilled in the design and implementation of such systems are highly sophisticated in the complex signal and processing techniques and configurations utilized in such systems, so that no detailed consideration thereof is necessary.

In view of the preceding description of multi-beam receive antenna systems in accordance with the invention, a method for receiving cellular communication signals from a user located in an azimuth sector by use of an antenna beam narrower than the sector, includes the steps of:

(a) identifying a first user signal by use of sector beam signals received in a sector beam 12' providing antenna beam coverage of the sector;

(b) providing a first plurality of narrow beams 21'-24', each providing antenna beam coverage narrower than the sector and collectively providing coverage of the sector;

(c) analyzing narrow beam signals received in each of the narrow beams on a continuing sequential basis with respect to the presence of the first user signal;

(d) selecting, on a predetermined basis (e.g., highest amplitude or best signal to spurious signal ratio), one of the narrow beam signals; and (e) coupling the selected narrow beam signal to an output port (e.g., switching output port 37) to enable coupling to a receiver 18 to provide the user signal with higher gain than provided by the sector beam. The method may additionally include repetition of steps (c), (d) and (e) to monitor changing reception conditions resulting in selection of a different one of the narrow beam signals and coupling of the different narrow beam signal to the output port. In a preferred form the method additionally permits selection of the sector beam so that steps (d) and (e) take the following alternative form:

(d) selecting, on a predetermined basis, one signal from the following group of signals, the narrow beam and the sector beam signals; and (e) coupling the selected beam signals to an output port to enable coupling to a receiver for processing of the user signal.

In order to provide for spaced diversity signal reception, the method may additionally include the steps of:

(f) providing a second plurality of narrow beams originating from positions laterally spaced from the originating positions of the first plurality of narrow beams, the second plurality of beams having characteristics similar to the first plurality of beams;

(g) repeating steps (c), (d) and (e) with respect to the narrow beams of the second plurality of narrow beams to analyze, select and couple a second selected narrow beam signal to a second output port; and (h) coupling a receiver system to the first and second output ports for use of at least one of the selected narrow beam signals to provide the user signal.

It will be apparent that the foregoing method is readily extendable to encompass the inclusion of a second receiver, such as receiver 19a of FIG. 1, to provide additional user capacity by dual or multi-frequency operation. Also, the method may include developing synchronizing signals by use of couplers 42 and 42a as already described with reference to FIG. 1.

There have thus been described receive antenna systems capable of enabling the reception of an acceptable form of user signal to be validated and a suitable high gain receive antenna beam coupled to a receiver for reception of stronger signals from the user. Alternatively, an acceptable signal level may be maintained while reliably receiving user signals over greater distances, thereby permitting use of larger cells and fewer antenna system installations. More specifically, with a 6 dB receive gain improvement through use of narrower beamwidth antennas it may be possible to reduce the number of antenna sites by one-half. The resulting savings are made possible by the present antenna systems which function to first detect the presence of a subscriber or user unit in a time slot. The system determines the beam currently providing the best receive signal from the user and activates the appropriate switching device to cause that beam to be coupled to the receiver. The system then continuously tracks the beam with best receive signal and controls the switching means so that the best signal for the user continues to be coupled to the receiver. This performance is provided in a system configuration which can be economically implemented and provides a fail/safe operating feature. In particular embodiments, the system can be arranged to operate in three basic modes. First, the system is initialized by use of signal samples derived from transmitted signals for purposes of system synchronization. The system is then operated in a normal operating mode as discussed in detail above. A third mode, not previously described, can address system maintenance by including automatic self test and a manual mode for diagnostic purposes, which may be implemented by skilled persons applying techniques applicable for such purposes.

OTHER EMBODIMENTS

The preceding description addresses the invention principally in the context of adding enhanced supplemental capabilities on a receive-only basis to an existing type of cellular communication system. In other applications, antenna systems in accordance with the invention can be arranged to provide narrow beam signal transmission to users and to provide complete antenna systems for reception, or transmission, or both, in cellular type communication applications, independently of inclusion of any sector antennas as discussed. Also, additional features to provide validation of an incoming signal as a type of signal capable of operation with a cellular system, enhanced beam selection in assignment of a narrow beamwidth beam for use with a newly identified user, and other capabilities can be included.

FIG. 4.

Figure 4:
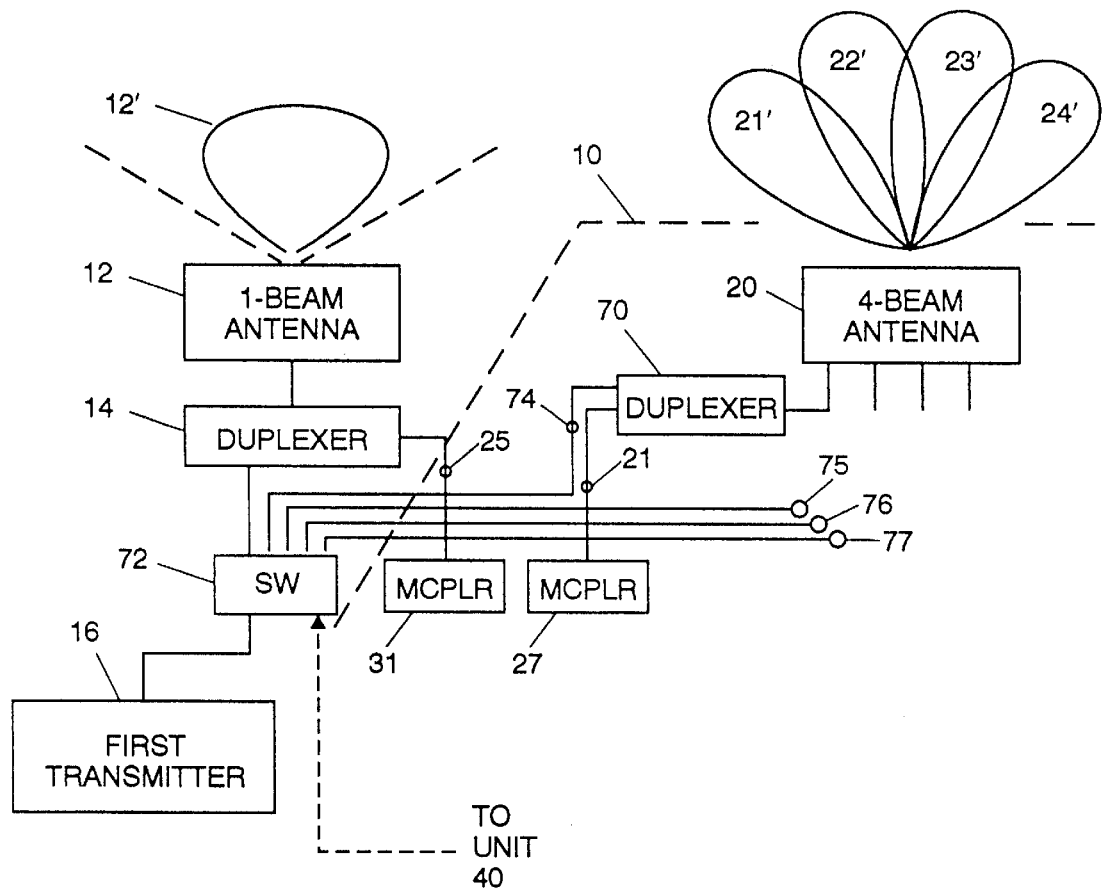
FIG. 4 shows a portion of the FIG. 1 system modified to provide narrow beam signal transmission.

With reference now to FIG. 4, there is shown a portion of the FIG. 1 antenna system which has been modified to provide narrow beamwidth signal transmission via the four beam antenna 20 previously described.

In this configuration, narrow beam higher gain operation is achieved for both reception and transmission. FIG. 4 should be viewed in the context of the complete FIG. 1 System, with the following changes. In FIG. 1, the arrangement enabled any of beams 21'–24' of antenna 20 to be selectively coupled to receiver unit 40 for signal reception, (via multicoupler means, only one of which is shown at 27 in FIG. 4). In FIG. 4 a duplexer 70 has been inserted in the line from multicoupler 27 to antenna 20 and duplexers would correspondingly be added in the lines from the other multicouplers. Also, in FIG. 4 transmitter switching means, shown as switch 72, has been inserted in the line from transmitter 16 to sector antenna 12. As indicated, switch 72 has five outputs, enabling signals from transmitter 16 to be coupled to antenna 12 via duplexer 14, to beam 21' of antenna 20 via coupling point 74 and duplexer 70, or to any one of beams 22'–24' in similar manner via coupling points 75–77. As previously discussed, access to the four beams of antenna 20 via four antenna ports is provided by operation of a beam forming network which may be included as a portion of antenna 20. With this arrangement, communication with a particular user can be enhanced by a significant increase in transmitted signal strength, for example, by transmitting to the user via narrow beam 21' instead of sector beam 12'. The reliability and continuity of both signal reception and signal transmission over greater distance are thus enhanced. In operation, switch 72 may be set in response to selection signals, provided by controller unit 40 as previously described, in order to provide signal transmission via the same one of beams 21'–24' selected for reception of signals from a particular user as already described. Other beam selection arrangements may be provided by skilled persons.

In implementation of the FIG. 4 type arrangement, it will be understood that the entire FIG. 1 system can be included, with modifications as typically shown in and described with reference to FIG. 4. Alternatively, since both receive and transmit functions are enabled by the FIG. 4 type arrangement, the sector antenna 12 and duplexer 14 can be omitted to provide a complete cellular type antenna system with narrow beam, high gain characteristics.

FIG. 5.

Figure 5:
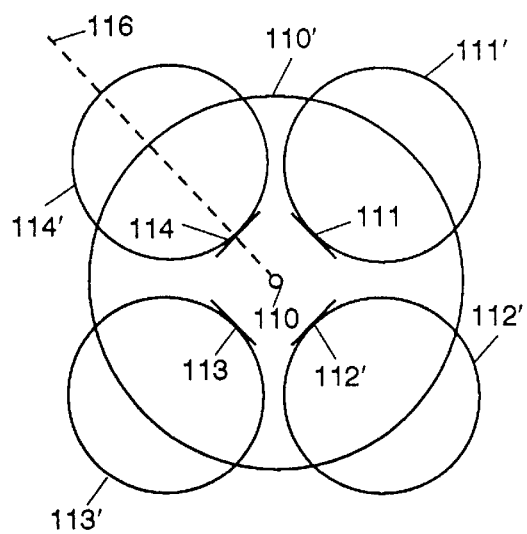
FIG. 5 illustrates an antenna configuration providing omnidirective azimuth coverage.

The antenna configuration of FIG. 1 is described in the context of a sector antenna 12 providing a beam having a beamwidth of 120 degrees at its half power points and an antenna 20 providing four contiguous narrower beams collectively providing the same 120 degree azimuth coverage. The invention is not limited to use with antennas of any particular beamwidth. FIG. 5 illustrates an alternative configuration wherein antenna 12 is replaced by antenna 110 providing omnidirective coverage in azimuth, as indicated by pattern 110'. Antenna 110 may be a type of vertical dipole or vertical monopole antenna seen here in plan view. The four beams of antenna 20 in FIG. 1 are replaced in FIG. 5 by four antennas 111–114, each providing nominally 90 degrees of coverage in azimuth at a particular gain level. The patterns of antennas 111–114 are represented at 111'–114' in FIG. 5. Antennas 111–114 may be of basically the same type as antenna 12 or antenna 20, modified to provide a single beam with 90 degree azimuth coverage. With this antenna configuration, operation corresponds to operation of the FIG. 1 system as described. A user signal incident at an azimuth 116 relative to antenna 110, for example, is acquired via the omnidirective pattern 110'. Then, if the signal level falls below a predetermined threshold level, by operation of system 10 of FIG. 1 the narrower 90 degree pattern 114' of antenna 114 is selected for signal reception. As represented in FIG. 5, the pattern 114' provides significantly higher gain along azimuth 116, as compared to the pattern 110'. In other arrangements the FIG. 5 arrangement can be used for both reception and transmission.

Figure 6A:
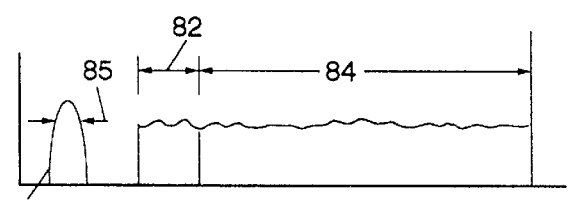
FIGS. 6A and 6B show typical signal formats.
Figure 6B:
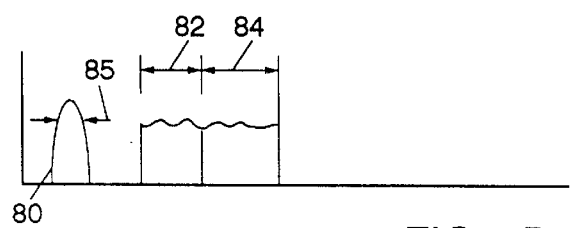

FIGS. 6A and 6B.

In FIGS. 6A and 6B there are illustrated waveforms of a signal portion received from a user which may be typical of cellular system signal characteristics. The particular signal portion is as shown at 80, FIGS. 6A and 6B respectively showing signal portion 80 in the context of a typical communication signal format 15 milliseconds in duration and a typical random access control signal format 7.5 milliseconds in duration. As indicated, each signal format also includes a sync portion 82 and a data portion 84. The FIG. 6B signal format may be used on a random access basis during initial user contact and verification prior to establishment of an active two-way communication link with a user. The FIG. 6A signal format includes an extended data portion 84 enabling normal cellular communication with the user.

In operation of the FIG. 1 system it is unproductive and undesirable to enhance reception of a signal which is not a user signal (such as a spurious signal, an interference signal or a noise signal) by selecting and allocating a narrow beamwidth, enhanced gain beam for reception of such signal. It is, therefore, desirable to validate received signals as to compatibility with the cellular system. This validation is different and more limited than approval of a user as a proper and good-standing subscriber entitled to use the cellular system, as necessary before a user is permitted to actually communicate over the facilities of the cellular system. For current objectives of initial validation for antenna system control purposes, it is desirable to provide a relatively simple method utilizing a standard signal such as signal portion 80. Portion 80 may typically be specified in the cellular system as having a reference duration of 500 microseconds, for example, at a predetermined amplitude level below peak amplitude of the signal, e.g., at 75 percent of peak amplitude as indicated at 85.

In accordance with the invention, a method for validating a received signal as an acceptable user signal prior to implementing a beam selection procedure comprises the following steps:

(a) providing a received signal which may be a user signal;

(b) analyzing the received signal to determine the presence of a signal portion (e.g., portion 80) having a reference duration (e.g., 500 microseconds) at a predetermined amplitude level relative to the peak amplitude of the signal portion (e.g., at 75 percent of peak amplitude); and (c) activating selection of a narrow beamwidth antenna beam for reception of the received signal following a positive determination of the presence of the signal portion (e.g., portion 80) having a duration at the predetermined amplitude level which is within predetermined tolerance limits relative to the reference duration.

It should be stressed that the objective here is to provide a reasonably reliable validation method able to be quickly, easily and economically implemented on a local basis. Loss of user call usage revenue is not directly involved and an erroneous validation for present purposes will subsequently be relatively quickly be remedied when no user call approval follows. Thus, the objective of simplicity, speed and cost effectiveness is met by the present method without requirement for the greater complexity of exchange of verification messages to different locations and the associated greater cost and time which may be justified in granting system usage approval to a user.

FIG. 7.

Figure 7:
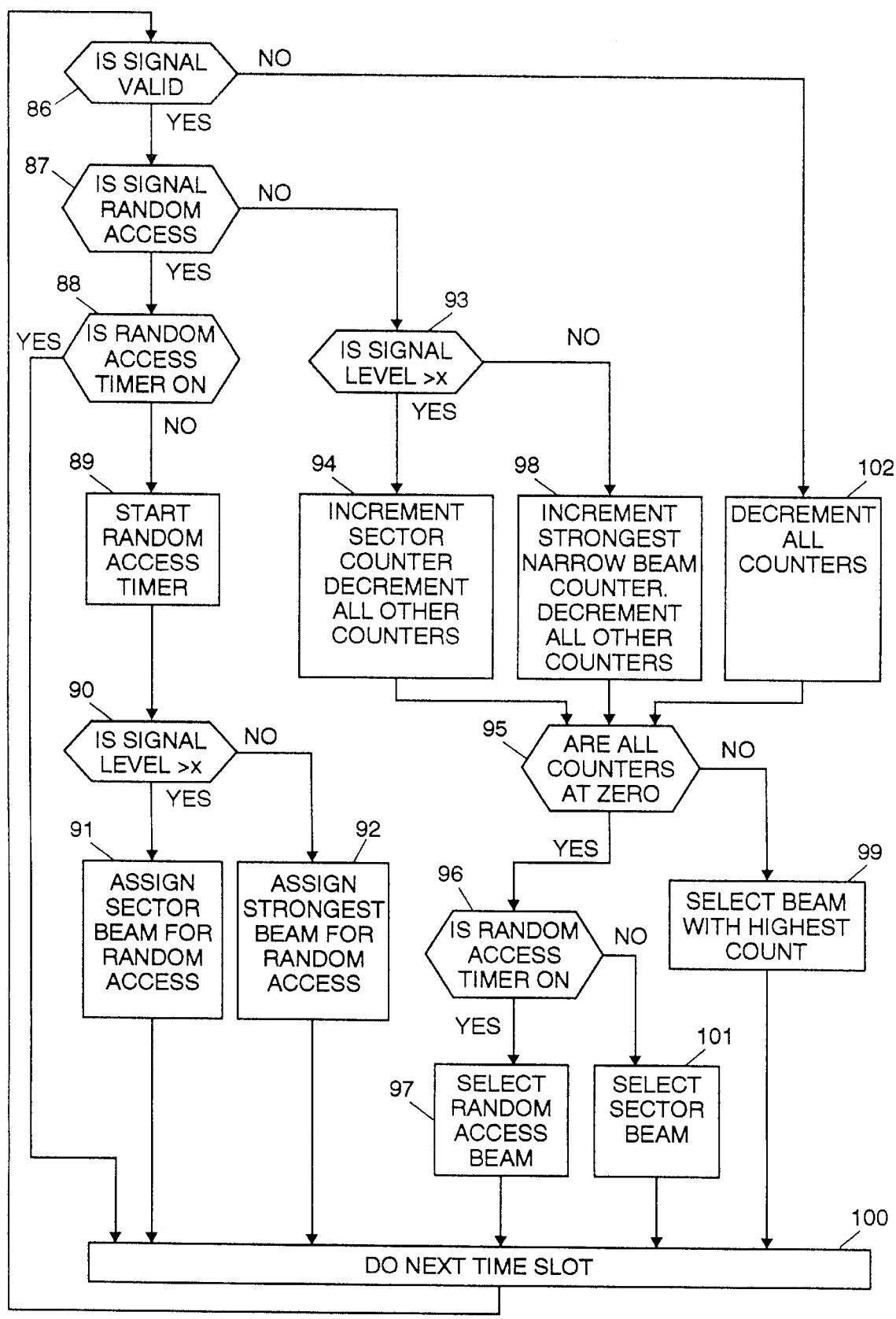
FIG. 7 illustrates a beam selection method in accordance with the invention.

An operational flow chart useful in describing a beam selection method in operation of a multi-beam antenna system in accordance with the invention is provided in FIG. 7. As described with reference to FIG. 3, beam selection for reception of a particular user signal at a particular time is determined by continuous monitoring of signal reception via individual ones of the four contiguous beams of antenna 20, for example, by coupling of each antenna beam port to the receiver unit 40 for a portion of each time slot during a repetitive progression of a series of time slots. As indicated in FIG. 3, during a 15 millisecond time slot each of beams 21'–24' is sampled in order. During the period after a user signal is received for access to the system, while user status and good standing are verified prior to establishment of a link for user communication, cellular systems may typically use a random access signal procedure wherein transmissions from the user of the types shown in FIGS. 6A and 6B utilize a varying sequence of different time slot allocations until the link is authorized and established. Such sequence is initiated by a single random access transmission (see FIG. 6B) and the control sequence to establish a link has a maximum completion time of 10 seconds, for example. The random nature of time slot usage in systems in which such an initial sequence procedure is involved makes it difficult to select the appropriate antenna beam for the particular user involved. However, at the same time, if the user signal is weak it will be important to take advantage of the higher reception gain provided by the invention in order to improve the reliability of communication during this critical initial period. The FIG. 7 method provides an effective solution.

With reference to FIG. 7, the basic approach is to dedicate all currently unused time slots to the control channel for a period of up to 10 seconds during establishment of a link for a new contact by a user. During this period, until link establishment, the antenna beam providing best reception for the user's initial contact is used as the default choice for the case in which the user signal appears as a weak signal. In FIG. 7, at step 86 validity is checked as discussed with reference to signal portion 80 of FIGS. 6A and 6B, for example. If the signal is a user contact random access signal (step 87), the 10 second timer is activated at step 89, unless already activated (step 88). At step 90 the signal level is checked to determine if its amplitude exceeds a predetermined level. If so, the signal is assigned to the wide-coverage sector beam for reception (step 91). For a small signal, reception is assigned, at step 92, to the one of the narrow beams which provided strongest signal reception for the initial signal from the user.

Then, as a non-random access signal is subsequently received from the user, after step 87 the signal amplitude is checked at step 93. For a signal exceeding the predetermined level, the method proceeds (via down counting step 94, counter level check step 95 and timer status check step 96) to assignment of signal reception to the narrow beam selected above as providing strongest reception (step 97). This assumes that without preceding signals from this user all counters (e.g., one counter for each beam) are and remain at zero. If, at step 93, the signal is a small signal the method proceeds to step 98, at which point the counter for the beam now providing strongest reception is incremented (count increased), while the counters for each of the other beams is decremented (count decreased). Then at step 95, the counter for the latter beam having a higher count, this beam will be assigned for signal reception at step 99. This process will then be continued for subsequent time slots via step 100. Iteration for such time slots may involve utilization of the sector beam selection step 101 and the invalid signal counter decrement step 102. On an overall basis, use of this method accomplishes both reception of weak user signals during this initial user verification period by an assigned narrow beam, even though the time slot usage may vary, and ultimate selection of the narrow beam providing strongest reception by the time final time slot allocation for this user is accomplished.

With this description it will be appreciated that the counter arrangement provides a weighting arrangement effective to assign an incoming signal to the appropriate narrow beam when adequate information is available for such assignment. This activity is repetitively carried out for successive time slots for a maximum period of 10 seconds, within which appropriate assignment should have been accomplished. In implementation of the FIG. 7 method by persons skilled in the art in different applications, the relevant counters can be arranged to be counted up at a rate greater than one count per 15 milliseconds and counted down at a rate of one count per 15 milliseconds at appropriate points in the process as discussed. The counters will typically have a predetermined ceiling as to how high their count is permitted to go and a floor value of zero counts. The actual count up rate and ceiling value in a particular application are determined in view of system tracking and hysteresis requirements.

Thus, with reference to FIG. 7, there is provided a beam selection method usable in a communication system wherein a user signal may initially be received in different ones of a plurality of available time slots. An embodiment of the method includes the following steps:

(a) providing a plurality of contiguous antenna beams (e.g., beams 21'–24');

(b) receiving an initial signal from a user (see FIG. 5B) in a first time slot of a repetitive series of time slots (e.g., as shown in FIG. 3);

(c) determining which antenna beam provided the strongest reception of the initial signal (e.g., by operation of the FIG. 1 system as described);

(d) assigning the antenna beam determined in step (c) for reception of subsequent signals from the user in all available time slots within a time period (e.g., by programming of unit 40 pursuant to the FIG. 7 method);

(e) providing a relative count for each antenna beam of occurrence of strongest reception of signals from the user in available time slots within such time period (e.g., pursuant to the FIG. 7 method); and (f) selecting for reception of signals from the user the antenna beam for which the step (e) relative count is the highest (e.g., pursuant to the FIG. 7 method).

In particular arrangements, such as described, the method may also include providing a sector beam (e.g., beam 12') and be arranged so that steps (c) through (f) are implemented only if the initial signal received in step (b) has an amplitude less than a predetermined level (a weak signal). As described, the method has particular application to use in cellular communication systems wherein the initial user signal is a randomly timed request for access to use of the system. In such a system, each time slot may be nominally 15 milliseconds long, as indicated in FIG. 3, and each such time slot may be one of a series of time slots, with the series repeated every 90 milliseconds. Also, the step (d) time period for use in this context may be a period which is nominally up to 10 seconds long. If beam selection for a weak incoming signal is not accomplished within that time period, because of signal interruption, interference or any other reason, a subsequent signal from the user may be processed as an initial signal from a new user and the beam selection initiated anew.

While there have been described the currently preferred embodiments of the invention, those skilled in the art will recognize that other and further modifications may be made without departing from the invention and it is intended to claim all modifications and variations as fall within the scope of the invention.

What is claimed is:

1. A method, for validating the form of a signal received by a cellular communication system, comprising the steps of:

(a) providing a received signal as a user signal;

(b) analyzing said received signal to determine the presence of a signal portion having a reference duration at a predetermined amplitude level relative to peak amplitude of said signal portion; and (c) providing a validation signal following a positive determination of the presence of said signal portion having a duration at said amplitude level which is within predetermined tolerance limits relative to said reference duration.

2. A method as in claim 1, wherein said step (b) analyzing is performed only with respect to a signal portion present within a predetermined timing interval relative to at least one of a reference portion and a synchronizing portion of said received signal.

3. A method as in claim 1, wherein said step (b) reference duration is nominally 500 microseconds measured at an amplitude level nominally equal to 75 percent of said peak amplitude of the signal portion.

4. A signal validation method for receiving cellular communication signals from a user located in an azimuth sector by use of an antenna beam narrower than said sector, comprising the steps of:

(a) by use of sector beam signals received in a sector beam providing antenna beam coverage of said sector, analyzing a received signal which may be a user signal to determine the presence of a signal portion having a reference duration at a predetermined amplitude level relative to peak amplitude of said signal portion, and validating said received signal as a user signal if the duration of said signal portion at said amplitude level is within predetermined tolerance limits relative to said reference duration;

(b) providing a first plurality of narrow beams, each providing antenna beam coverage narrower than said sector and collectively providing coverage of at least a portion of said sector;

(c) analyzing narrow beam signals received in each of said narrow beams with respect to the presence of said user signal;

(d) selecting, on a predetermined basis, one of said narrow beam signals; and (e) coupling said selected narrow beam signal to an output port to enable coupling to a receiver to provide said user signal with higher gain than provided for signals received in said sector beam.

5. A signal validation method as in claim 4, wherein said step (a) analyzing is performed only with respect to a signal portion present within a predetermined timing interval relative to at least one of a reference portion and a synchronizing portion of said received signal.

6. A signal validation method as in claim 4, wherein said step (a) reference duration is nominally 500 microseconds measured at an amplitude level nominally equal to 75 percent of said peak amplitude of the signal portion.

7. A signal validation method as in claim 4, wherein said narrow beam signals are analyzed in step (c) on a continuing sequential basis.

8. A signal validation method as in claim 4, additionally comprising repetition of steps (c), (d) and (e) to monitor changing reception conditions resulting in selection of a different one of said narrow beam signals and coupling of said different narrow beam signal to said output port.

9. A signal validation method for receiving cellular communication signals from a user located in an azimuth sector by use of an antenna beam narrower than said sector, comprising the steps of:

(a) analyzing a received signal which as a user signal to determine the presence of a signal portion having a reference duration at a predetermined amplitude level relative to peak amplitude of said signal portion, and validating said received signal as a user signal if the duration of said signal portion at said amplitude level is within predetermined tolerance limits relative to said reference duration;

(b) providing a first plurality of narrow beams, each providing antenna beam coverage narrower than said sector and collectively providing coverage of at least a portion of said sector;

(c) analyzing narrow beam signals received in each of said narrow beams with respect to the presence of said user signal;

(d) selecting, on a predetermined basis, one of said narrow beam signals; and (e) coupling said selected narrow beam signal to an output port to enable coupling of said user signal to a receiver.

10. A signal validation method as in claim 9, wherein said step (a) analyzing is performed only with respect to a signal portion present within a predetermined timing interval relative to at least one of a reference portion and a synchronizing portion of said received signal.

11. A signal validation method as in claim 9, wherein said step (a) reference duration is nominally 500 microseconds measured at an amplitude level nominally equal to 75 percent of said peak amplitude of the signal portion.

12. A signal validation method, for use in a multi-beam antenna system including a sector antenna providing a sector beam for coverage in a sector with a first gain, antenna means for providing a plurality of narrow beams each narrower than said sector beam and providing higher gain, and controller means responsive to a validation signal to analyze narrow beam signals received in each of said narrow beams with respect to presence of user signals from said user and to select one of said narrow beam signals on a predetermined basis for coupling to a receiver, said method comprising the steps of:

(a) providing a received signal as a user signal;

(b) analyzing said received signal to determine the presence of a signal portion having a reference duration at a predetermined amplitude level relative to peak amplitude of said signal portion; and (c) providing a validation signal to said controller means following a positive determination of the presence of said signal portion having a duration at said amplitude level which is within predetermined tolerance limits relative to said reference duration.

13. A signal validation method as in claim 12, wherein said step (b) analyzing is performed only with respect to a signal portion present within a predetermined timing interval relative to at least one of a reference portion and a synchronizing portion of said received signal.

14. A signal validation method as in claim 12, wherein said step (b) reference duration is nominally 500 microseconds measured at an amplitude level nominally equal to 75 percent of said peak amplitude of the signal portion.

15. A signal validation method as in claim 12, wherein said predetermined basis comprises one of the following, selecting the best signal to spurious signal ratio and selecting the highest signal amplitude, for signals received from said user.

* * * * *